(12) United States Patent
Esser et al.

(10) Patent No.: US 10,135,887 B1
(45) Date of Patent: Nov. 20, 2018

(54) SHARED MULTIMEDIA ANNOTATIONS FOR GROUP-DISTRIBUTED VIDEO CONTENT

(71) Applicant: Cox Communications, Inc., Atlanta, GA (US)

(72) Inventors: Patrick J. Esser, Atlanta, GA (US); Douglas David Gravino, Roswell, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 249 days.

(21) Appl. No.: 14/080,052

(22) Filed: Nov. 14, 2013

Related U.S. Application Data

(60) Provisional application No. 61/800,666, filed on Mar. 15, 2013.

(51) Int. Cl.
  *G06F 17/00* (2006.01)
  *H04L 29/06* (2006.01)
  *G06F 17/24* (2006.01)

(52) U.S. Cl.
  CPC ............ *H04L 65/403* (2013.01); *G06F 17/00* (2013.01); *G06F 17/242* (2013.01)

(58) Field of Classification Search
  CPC ....... G06F 17/00; G06F 17/242; H04L 65/403
  See application file for complete search history.

(56) References Cited

U.S. PATENT DOCUMENTS

| | | | |
|---|---|---|---|
| 8,978,075 B1* | 3/2015 | Kaiser et al. ................... 725/62 |
| 2006/0161838 A1* | 7/2006 | Nydam ................. G06F 17/241 715/202 |
| 2007/0245243 A1* | 10/2007 | Lanza et al. ................... 715/723 |
| 2008/0177752 A1* | 7/2008 | Kulkarni ........... G06F 17/30038 |
| 2008/0301237 A1* | 12/2008 | Parsons et al. ................ 709/206 |
| 2009/0070805 A1* | 3/2009 | Delia et al. ...................... 725/34 |
| 2009/0187825 A1* | 7/2009 | Sandquist ............. G06F 17/241 715/719 |
| 2009/0210779 A1* | 8/2009 | Badoiu et al. ................. 715/230 |
| 2009/0300475 A1* | 12/2009 | Fink .................... G06F 17/3082 715/230 |
| 2010/0138209 A1* | 6/2010 | Harrenstien et al. ............. 704/2 |
| 2011/0173065 A1* | 7/2011 | Lester et al. ................ 705/14.45 |
| 2012/0158755 A1* | 6/2012 | Gammill ........... G06F 17/30044 707/754 |
| 2012/0311618 A1* | 12/2012 | Blaxland ................ H04H 60/33 725/9 |
| 2012/0321271 A1* | 12/2012 | Baldwin et al. .............. 386/201 |

* cited by examiner

*Primary Examiner* — William L Bashore
*Assistant Examiner* — Daniel W Parcher
(74) *Attorney, Agent, or Firm* — Merchant & Gould

(57) ABSTRACT

Synchronized multi-media annotations for shared video content is provided. According to embodiments, viewers of video content may be enabled to create multimedia annotations such as simple text comments, short videos, audio snippets, links to websites or other online content, etc., and associate the annotations with certain points or sections in the source video. When a user "shares" these annotations with a community of friends, the friends can then watch the source video and simultaneously view and/or listen to the comments their friend(s) have made. Friends may respond back with their own annotations, and again share those out to the group of friends. Later, users who have previously left comments may be able to go back and see other users' comments/annotations.

27 Claims, 7 Drawing Sheets

(12) United States Patent

SHARED MULTIMEDIA ANNOTATIONS FOR GROUP-DISTRIBUTED VIDEO CONTENT

CROSS-REFERENCE TO RELATED APPLICATIONS

The application claims priority to U.S. Provisional Patent Application No. 61/800,666 titled "Shared Multimedia Annotations for Group-Distributed Video Content" filed Mar. 15, 2013, the disclosure of which is hereby incorporated by reference in its entirety.

BACKGROUND

Many viewers of performances, whether live or broadcast, and perhaps especially viewers of films and television shows enjoy making comments to each other about what they are seeing unfold before them. For example, in recent times, friends and family members may gather together to watch a movie or television show, wherein part of their shared communal experience may include talking to each other during the show or film about what is going on in the show. Sometimes, comments may be in the form of serious questions or commentary, and other times, comments may be made in a light-hearted and humorous way.

As individuals' lives have become busier and as family and friends have become more dispersed from a single geographic area, in modern times, opportunities for communal viewing have decreased, and more video content is being viewed independently and individually. Additionally, video content viewing is often time-shifted, for example, via the use of digital video recorders (DVRs) and consumption of video on demand (VOD) content, such that friends who may be geographically close may not watch video content at the same time.

A variety of attempts have been made by various social networks or social television aggregators to provide assorted types of "live chat" experiences during television programs or other broadcast events. Although such solutions may help to enable users in remote locations to make comments while they watch a same show, the users may be restricted to simultaneous viewing of video content. As can be appreciated, simultaneous watching of video content, especially by users who are located in different time zones, may be challenging, and "live chat" in time-shifted content may be not be provided.

Although users may be less likely or able to communally watch video content, the desire for shared viewing experiences still exists. It is with respect to these and other considerations that the present invention has been made.

SUMMARY

Embodiments of the present invention solve the above and other problems by providing synchronized multi-media annotations for shared video content. According to embodiments, viewers of video content may be enabled to create multimedia annotations such as simple text comments, short videos, audio snippets, links to websites or other online content, etc., and associate the annotations with certain points or sections in the source video. When a user "shares" these annotations with a community of friends, the friends can then watch the source video and simultaneously view and/or listen to the comments their friend(s) have made. Friends may respond back with their own annotations, and again share those out to the group of friends. Later, users who have previously left comments may be able to go back to see everyone else's comments, and accordingly, a modern recreation of a shared experience that would have otherwise been lost may be provided.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Referring now to the drawings in which like reference numbers represent corresponding parts throughout.

DETAILED DESCRIPTION

Figure 1:
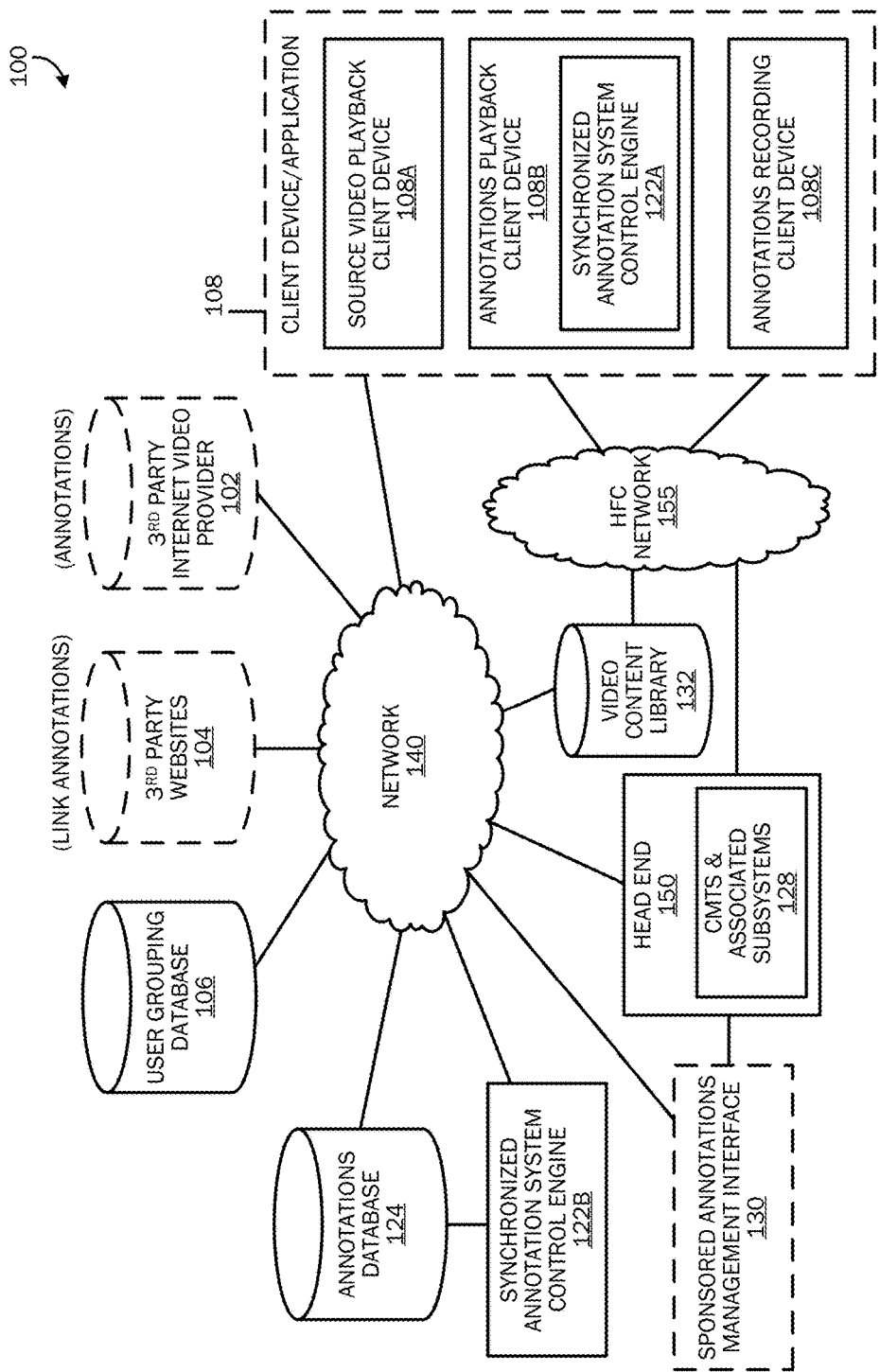
FIG. 1 is a simplified block diagram illustrating a system for providing shared multimedia annotations for group-distributed video content.

As briefly described above, embodiments of the present invention provide synchronized multi-media annotations for shared video content. A user may create an annotation (e.g., a text-based comment, a video-based comment, an audio-only comment, a link to a website, etc.), and associate the annotation to a location, point, or to another annotation in a piece of video content to which a plurality of users may have access. Created annotations may be shared with a group of users. When a user plays back the piece of video content, associated annotations may be displayed/played at their designated locations or points in the source video content.

Embodiments may not be limited to social video content viewing, but may be utilized in various other contexts. For example, embodiments may be utilized in an educational setting where instructors or students may want to make annotations or comments on a recorded lecture, or in a business setting where business users may want to make annotations or comments on a presentation or a piece of content that is being edited for commercial purposes.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

FIG. 1 is a simplified block diagram illustrating one embodiment of a system 100 for providing synchronized multi-media annotations for shared video content. According to embodiments, users may be enabled to create annotations that are linked to specific locations within a source video file. The source video file may be a piece of video content that a user may select to view at any time, such as Video on Demand (VOD) content, episodic television content, movies, pre-recorded content, digital video recorder (DVR) recorded content, etc. The source video file may be stored in a video content library 132, and may be provided to users via an IP network 140 or via a traditional video distribution head end 150 including a cable modem termination system (CMTS) 128. According to embodiments, the CMTS 128 may combine individual network television channels, VOD channels, and IP data via multiplexing onto fiber or coaxial cable for distribution to customers, for example, via an HFC network 155.

Annotations may include text, video clips, audio clips, links to Internet websites or other third party websites 104, etc. Annotations and/or annotation metadata may be stored in an annotations database 124 (which may be a single database or a plurality of databases). According to an embodiment, annotations may be stored in different databases 124 depending on annotation content type. For example, text-based annotation data may be stored in one database, whereas short video annotations may be stored in a separate storage system. According to an embodiment, annotations may be stored in a third party Internet video provider database 102, for example, a video sharing website database such as a YouTube® database.

Annotation metadata may include a list of points in a source video file and a link to what annotations should be displayed/played at each point. Points in a source video file to which annotations are synchronized may be defined based on timestamps, frame markers, chapter markers, other annotations, or various other means of identifying particular locations in the source video file. The annotations may be stored together or may be stored separately from the annotation metadata. As multiple users in a group create annotations for a same piece of source video content, either a single combined metadata file or a plurality of individual separate metadata files may be created and stored.

A user may select to share his created annotations with a group of other users who have access to the source video content. The group of users may be defined within a user grouping database 106. According to an embodiment, an external third party social networking service may be utilized to manage group lists. User groupings may be user-managed or group-managed, and may include varying levels of access control. For example, in a social use case, a group of users may be an "old college buddies movie watching" group where any user in the group may add or remove users and may contribute annotations equally. Alternatively, in an educational use case, an instructor may wish to more tightly control who can access annotations and leave annotations, etc.

Each user may play back the source video on a client device 108. The client device 108 may include various types of devices such as a set-top box (STB), a computer, a tablet computing device, a mobile phone, a gaming device, a networked television, or other type of networked receiving and decoding device. According to embodiments, a client device 108 may be operable to play source video content, to play/display annotations, and to record annotations. Playing source video content, playing/displaying annotations, and recording annotations may be performed on a single client device 108, or on separate client devices 108. For example, a user may watch a piece of source video content on a television in communication with a STB, and may view annotations or record annotations via a separate client device 108, such as a tablet computing device.

As just described, a user may utilize separate client devices 108 for playing source video content, for playing/displaying annotations, and for recording annotations. As such, components for performing each of the above functions will be described separately, although it is to be understood that some or all of the components may be integrated into a single client device 108.

According to embodiments, a client device 108 operable to record annotations (herein referred to as an annotations recording device 108C) may be embodied in a variety of physical devices (e.g., computer, tablet device, smartphone, gaming device, etc.), or in a variety of applications for devices. The annotations recording device 108C may be utilized to create/define a user's annotations. Annotations may be text-based, video-based, audio-only, web links, etc. For example, a smartphone with a camera may be used to record a user making a short video of himself leaving a comment for a friend at a particular point in a source video file being consumed/played on the same device or on a different device, for example, a STB. If the source video file is being consumed/played on a separate device (herein referred to as a source video playback client device 108A), identifying location information associated with the video source file may be synchronized between the source video playback client device 108A and the annotations recording device 108C.

According to embodiments, a client device 108 operable to play back annotations (herein referred to as an annotations playback device 108B) may be embodied in a variety of physical devices (e.g., STB, computer, tablet device, smartphone, gaming device, etc.), or in a variety of applications for devices. The annotations playback device 108B may be operable to display annotations inserted into a source video content file by other users in a group synchronously with playback of the source video content file. According to embodiments, annotations may be played/displayed on a same device on which the source video content file is being played back, or may be played/displayed on a separate device. If the annotations playback device 108B is a different device than the source video playback client device 108A, the two devices may be synchronized such that annotations may be played/displayed at their appropriate linkage locations in the source video content file. This will be described in greater detail below.

According to an embodiment, control of the synchronized annotation system may be performed locally, wherein the annotations playback client device 108B may comprise a local synchronized annotation system control engine 122A. According to another embodiment, control of the synchronized annotation system may be centrally controlled via a centralized synchronized annotation system control engine 122B. According to another embodiment, control of the synchronized annotation system may be combined into a hybrid approach, wherein some functionalities may be performed by a centralized synchronized annotation system control engine 122B, and other functionalities may be performed by a local synchronized annotation system control engine 122A.

The synchronized annotation system control engine 122A,B may be operable to perform such tasks as retrieving user groupings, looking up annotation metadata for each piece of source video content, sending appropriate remote tuning commands (e.g., playback, VOD playback, etc.) to the source video playback client device 108A, pushing annotation content playback commands to the annotations playback client device 108B at appropriate synchronized times, etc. A centralized synchronized annotation system control engine 122B may also be further operable to control other features such as user interaction, sponsored advertising annotation insertion, record keeping/accounting, etc. A local synchronized annotation system control engine 122A may be further operable to perform other features such as user-level messaging, sending requests for sponsored annotations, etc.

According to embodiments, the source video playback client device 108A may be operable to play back a source video content file, and may provide playback controls, such as start, stop, pause, rewind, forward, etc. For example, the source video playback client device 108A may be embodied in a variety of physical devices (e.g., a set-top box (STB), a tablet device, a smartphone, a computer, a gaming device, a video streaming device, a DVD player, a Blu-ray® player, etc.), or in a variety of applications for devices. The source video playback client device 108A may comprise a control logic subsystem, which may control functionality of the source video playback client device 108A, communicate with the video content library 132, and may communicate with the synchronized annotation system control engine 122A, the annotations playback client device 108B, and the annotations recording client device 108C.

According to an embodiment, a source video playback device 108A may comprise a tuning subsystem, which may be utilized to tune to a particular channel in a multiplexed video distribution feed, such as a particular VOD feed from the head end 150. The source video playback device 108A may optionally comprise a DVR subsystem operable to recording television programming and to play it back upon request. For synchronized annotations, the tuner and the DVR subsystem may be controlled by the synchronized annotation system control engine 122A,B.

If a separate client device 108 is utilized to play/display annotations (i.e., the annotations playback device 108B), the source video playback device 108A may be operable to stay synchronized with the annotations playback device 108B. Likewise, if a separate client device 108 is utilized to record annotations (i.e., the annotations recording device 108C), the source video playback device 108A may be operable to stay synchronized with the annotations recording device 108C.

According to an embodiment, the source video playback device 108A may be operable to communicate playback control actions (e.g., start, stop, start, stop, pause, rewind, forward, etc.) to the annotations playback device 108B, the annotations recording device 108C, and/or to the synchronized annotation system control engine 122A,B.

According to another embodiment, the source video playback device 108A may be operable to communicate a current playback position to the annotations playback device 108B, the annotations recording device 108C, and/or to the synchronized annotation system control engine 122A,B. The current playback position may be communicated at predefined intervals and/or at certain events.

According to another embodiment, the source video playback device 108A may be operable to request and/or receive a list of known annotation linkage locations prior to playback of the source video content. The source video playback device 108A may then communicate annotation linkage locations (either automatically or upon receiving a request) to the annotations playback client device 108B and/or to the synchronized annotation system control engine 122A,B when the linkage locations are reached during source video playback.

Embodiments of the present invention may provide for an inclusion of sponsored annotations provided by advertisers or by a service provider. According to an embodiment, sponsored annotations may be shared with all users or with a subgroup of users. A sponsored annotation may be an advertisement annotation associated with a point in a movie or show (source video content). For example, a short video clip advertisement for an automobile manufacturer may be presented as an annotation that may be displayed when a character in a movie drives a car made by the automobile manufacturer.

Sponsored annotations may be marked as to be displayed to all users, may be targeted to a subgroup of users, may be displayed to users who do not select to opt-out of sponsored annotations, or may be displayed to users who do select to opt-in for sponsored annotations. For example, a user may select to pay a fee to opt-out of sponsored annotations, or may receive a discount or be able to watch certain source video content for free if he selects to opt-in for allowing display/play of sponsored annotations. A sponsored annotation may be displayed every time a source video file is played, or may be displayed a predetermined number of times. The system 100 may optionally comprise a sponsored annotations management interface 130 operable to configure and manage sponsored annotations. The sponsored annotations management interface 130 may be able to count and track a number of users that have viewed a sponsored annotation.

Figure 2:
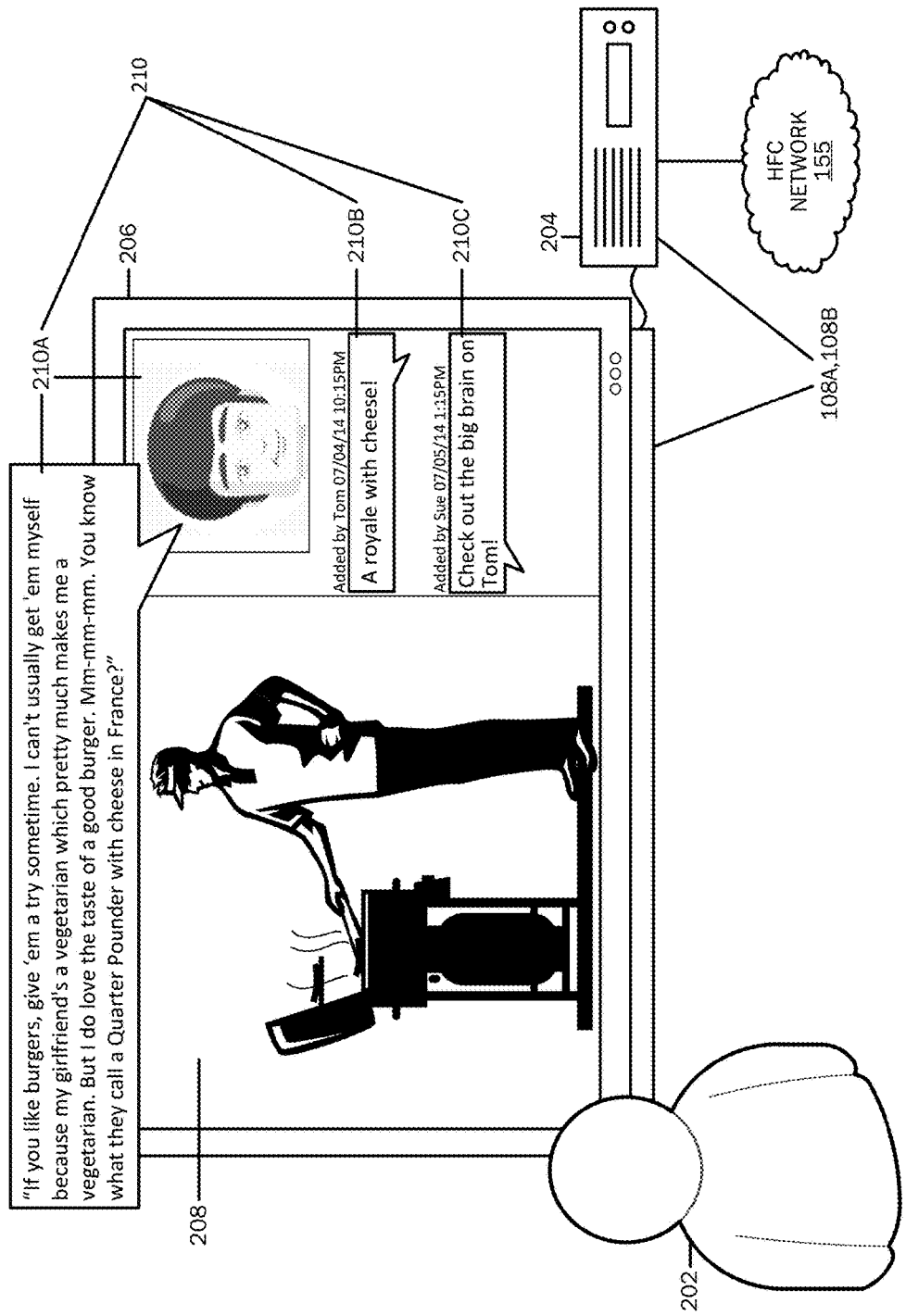
FIG. 2 is an illustration of an example source video file and annotations displayed on a same client device.

Referring now to FIG. 2, an example of annotations being played/displayed is shown. According to the example illustrated in FIG. 2, a source video file 208 and example annotations 210 are shown played/displayed on a source video playback client device 108A and annotations playback client device 108B embodied in a STB 204 in communication with a television 206. In this example, the source video file 208 and annotations 210 are displayed on a same client device 108. As described above, annotations 210 may include text, short videos, audio snippets, links to websites or other online content, etc. In the example illustrated in FIG. 2, a first annotation 210A is a video file recorded by a user and shared with one or more other users 202. The annotation 210A may be displayed at a particular point or section in the source video file 208 as defined by the annotation metadata.

According to embodiments, a notification may be provided to users 202 that a piece of source video content 208 contains annotations 210. This notification may be passive or active. For example, a passive notification may include a list of content from an inbox-type system, where a user 202 may be enabled to see what content items (e.g., source video content 208) comprise annotations 210 and from whom. An active notification may include a message (e.g., a text message, and email, a pop-up message, etc.) provided to a user 202 notifying the user that another user has left annotations 210 in a source video content file 208, and has selected to share it with the user. Embodiments may provide for allowing a user 202 to view only new annotations 210, for example, providing for skipping ahead to locations in the source video file 208 associated with new annotations 210, or to display only new annotations left since the last time the user 202 played the source video content file 208.

As illustrated, a second annotation 210B is a text annotation, and is displayed below the first annotation 210A. In this example, the second annotation 210B is provided in response to the first annotation 210A, although it is to be understood that an annotation 210 may be created in response to another annotation or independently of other annotations. Other information or metadata may also be provided/displayed, such as a name of the user who has created the annotation 210, when the annotation was created, etc. As illustrated, a third annotation 210C is another text annotation, and is displayed below the second annotation 210B. When viewing the source video file 208 and annotations 210, the user 202 may wish to create additional annotations 210 and metadata. For example, the user 202 may wish to respond to another user's comments with his own comments.

Although the annotations 210 are illustrated as displayed in a split screen-type interface, annotations 210 may be displayed in a variety of ways. For example, annotations 210 may be displayed as text overlays, in a picture-in-picture interface, simultaneous audio, etc. The amount of time a text annotation may be displayed may be either predefined or may be rules-based (e.g., a fixed time period per character, word, line, etc.). According to an embodiment, if a same location in a source video file 208 has multiple annotations 210 from multiple users 202 in a group associated with it, the plurality of annotations 210 may be displayed at the same time (as illustrated). Embodiments may provide for automatically converting annotations 210 to a preferred type of annotation for optimal viewing. For example, an audio track of a video annotation 210 may be converted into an overlay text annotation via a speech-to-text conversion system so as to not have two audio tracks playing simultaneously, translating an annotation 210 to another language via a translation system, etc.

Figure 3:
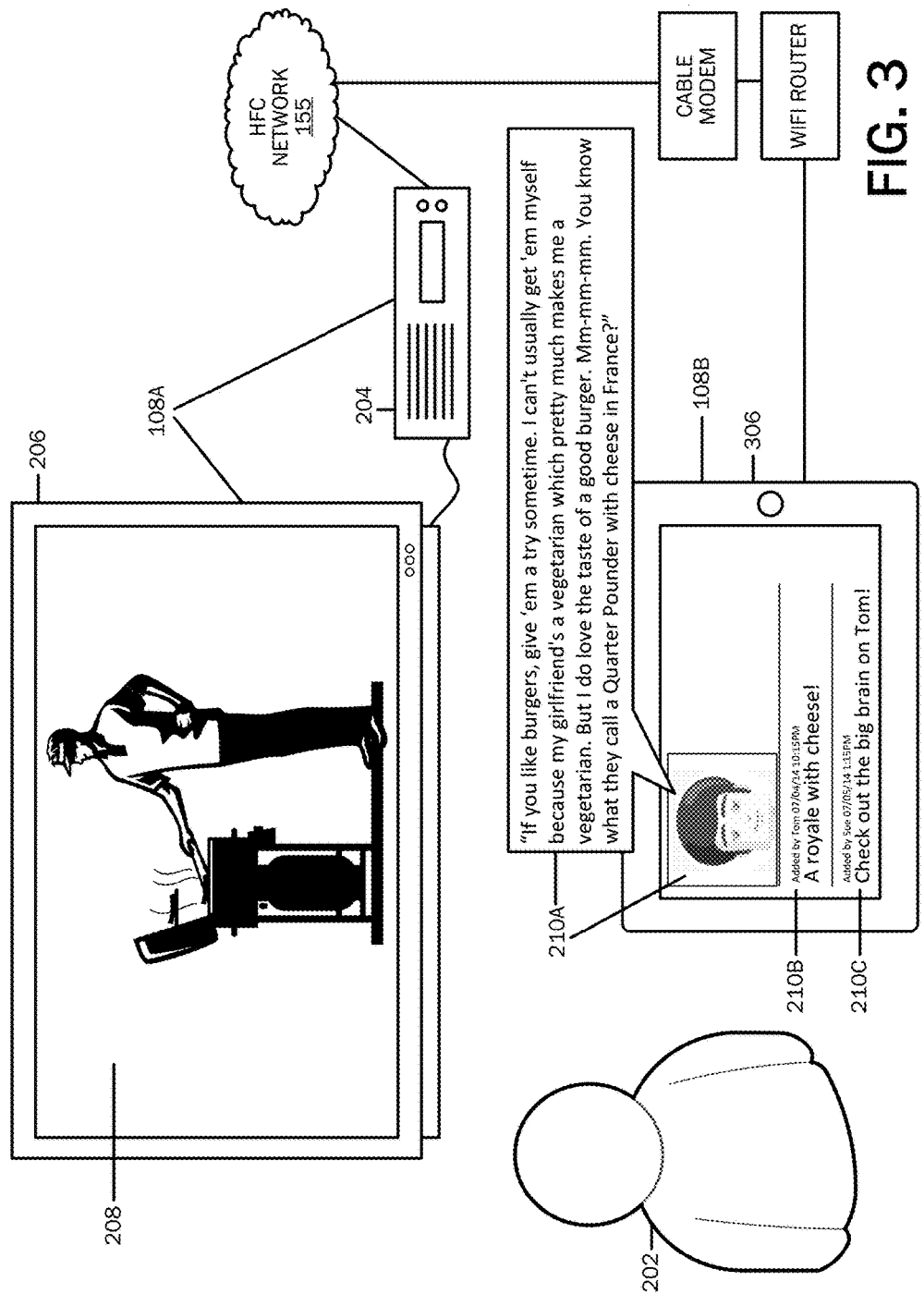
FIG. 3 is an illustration of an example source video file displayed on a source video playback client device and annotations displayed on a separate annotations playback client device.

Referring now to FIG. 3, another example of annotations 210 being played/displayed is shown. According to the example illustrated in FIG. 3, a source video file 208 is shown played/displayed on a source video playback client device 108A embodied in a STB 204 in communication with a television 206, and example annotations 210 are shown played/displayed on an annotations playback client device 108B embodied in a tablet device 306. In this example, the source video file 208 and annotations 210 are displayed on separate but synchronized client devices 108A,B. As described above, the source video playback client device 108A may be operable to communicate playback actions (e.g., start, stop, pause, rewind, fast forward, etc.) and/or communicate current playback positions at predefined intervals to the annotations playback client device 108B or to the synchronized annotation system control engine 122A,B to provide for synchronization. According to embodiments, a source video content file 208 may be automatically or manually paused during playing/displaying of certain annotations 210. Accordingly, the annotations playback client device 108B may be operable to communicate a pause action to the synchronized annotation system control engine 122A,B, the source video client device 108A, or other systems (e.g., a VOD platform, DVR subsystem, etc.).

Figure 4:
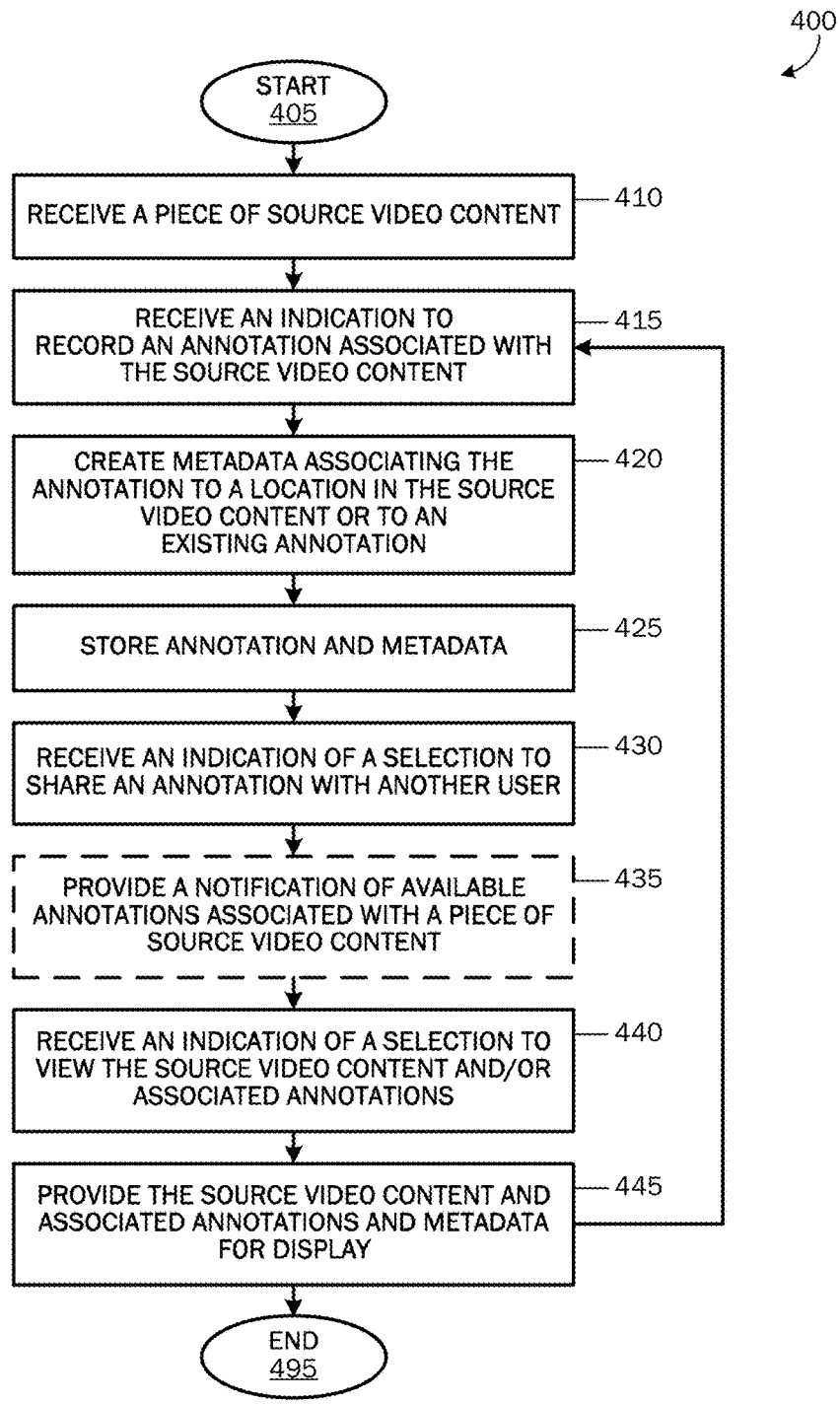
FIG. 4 is a flow chart of a method for automatically providing shared multimedia annotations for group-distributed video content according to an embodiment.

Having described a system architecture 100 and examples of annotations 210, FIG. 4 is a flow chart of a method for providing shared multimedia annotations for group-distributed video content according to an embodiment. The method 400 may begin at START OPERATION 405, and may proceed to OPERATION 410, where a piece of source video content 208 is received. The source video content 208 may be stored in a video content library 132, for example, a VOD platform or other pre-recorded content library. According to an embodiment, the source video content 208 may include video content recorded on a user's DVR.

At OPERATION 415, an indication of a selection to record an annotation 210 associated with the source video content 208 may be received. That is, a user may create multimedia annotations 210 such as text-based comments, video-based comments, audio comments, web links, etc. As described above, an annotation 210 may be recorded on a same client device on which the source video content 208 is being played, or alternatively, may be recorded on another client device. If an annotation 210 is recorded on a separate client device 108, timestamp data or other identifying location information may be synchronized between the source video playback client device 108A and the annotations recording client device 108C.

At OPERATION 420, metadata may be created or defined associating each annotation to a particular point in or section of the source video content 208 or to another existing annotation 210 provided by another user 202. A point in the source video content 208 to which an annotation 210 is synchronized may be defined based on timestamps, frame markers, chapter markers, other annotations 210, or any other means of identifying particular locations in the source video 208. As multiple group members create annotations 210 for a same piece of source video content 208, either a single combined metadata file or individual separate metadata files may be used.

At OPERATION 425, an annotation 210 and its metadata may be stored. As described above, annotations 210 and metadata may be stored in a single database 124 or in a plurality of databases. The annotations may be stored together or may be stored separately from the annotation metadata. As multiple users in a group create annotations for a same piece of source video content, either a single combined metadata file or a plurality of individual separate metadata files may be created and stored. According to an embodiment, annotations 210 may be stored in different databases 124 depending on annotation content type. For example, text-based annotation data may be stored separately from video annotations. According to another embodiment, annotations 210 may be stored in a third party Internet video provider database 102.

The method 400 may proceed to OPERATION 430, where an indication of a selection to share an annotation 210 with another user 202 may be received. The user may define and/or edit a group of friends or other groupings for sharing annotations 210 via an external, third party social network, or an internal system. Annotations 210 may be shared with other users 202 who have access to the same source video content 208.

The method 400 may optionally proceed to OPERATION 435, where a notification may be provided to users 202 selected to receive an annotations 210 informing them of available annotations 210 associated with a piece of video content. OPERATION 435 may include active notifications, for example, providing a message to a user 202 notifying him that another user has selected to share an annotation 210 with him. Alternatively, OPERATION 435 may include passive notifications, for example, making a notation of an annotated piece of video content in a list or inbox-type system where a user 202 may be able to view content items (source video content 208 items) having annotations 210 associated with them. OPERATION 435 may include notifying a user 202 of a response to an annotation 210 or of additional annotations 210 left by other users 202.

At OPERATION 440, an indication of a selection to play back the source video content 208 and associated annotations 210 or to view new annotations 210 may be received, and at OPERATION 445, source video content 208 and/or the associated annotations 210 and annotation metadata may be provided. At OPERATION 445, the source video content 208 may be played back including available annotations 210 from other users 102 for the particular piece of source video content 208. OPERATION 245 may include displaying/playing the annotations 210 at their associated points/sections in the source video content 208 as defined in the annotation metadata, and optionally displaying information associated with the user 102 who provided the annotation 210. Annotations 210 may be displayed either on the same client device 108 on which the user is viewing the source video content 208 (e.g., a television set 206 in communication with a STB 208) or on a separate but synchronized device (e.g., source video content 208 displayed on a television set 206 with annotations 210 displayed on a tablet device 306).

OPERATION 445 may comprise determining what types of and how annotations 210 are displayed/played, for example, text overlays only vs. picture-in-picture video vs. simultaneous audio, whether to pause source video while a video annotation is played, how long text-based annotations stay on-screen, etc. In addition, converting annotations 210 to a preferred multimedia type for optimal viewing may be provided (e.g. converting the audio track from a video annotation into overlay text via a speech-to-text conversion system so as to not have two audio tracks playing simultaneously, converting English-language text annotations into Spanish via a translation system, etc.). OPERATION 445 may include skipping ahead in a source video content 208 to a next location in the source video content 208 with associated annotations 210 or to only new or changed annotations 210 since the last time the user played the source video content 208.

The method 400 may return to OPERATION 415, where additional annotations 210 and metadata may be created as desired (e.g. responding to another user's comments with one's own comments), or may end at OPERATION 495. According to embodiments, providing synchronized multimedia annotations for shared video content 208 may be implemented in many ways without detracting from fundamental approach.

Figure 5:
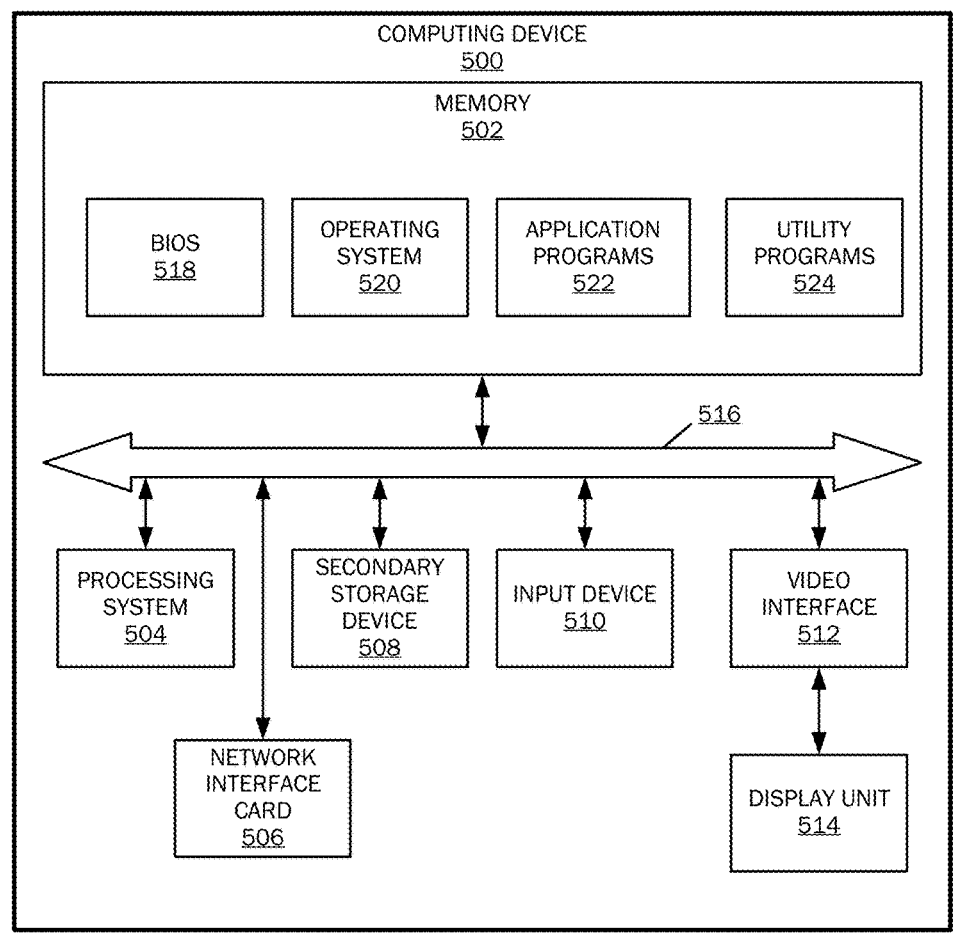
FIG. 5 is a block diagram illustrating example physical components of a computing device with which embodiments may be practiced.

FIG. 5 is a block diagram illustrating example physical components of a computing device 500 with which embodiments may be practiced. In some embodiments, one or a combination of the components of the synchronized multimedia annotations system 100 may be implemented using one or more computing devices like the computing device 500. It should be appreciated that in other embodiments, one or a combination of the components of the synchronized multimedia annotations system 100 may be implemented using computing devices having hardware components other than those illustrated in the example of FIG. 5.

Computing devices may be implemented in different ways in different embodiments. For instance, in the example of FIG. 5, the computing device includes a processing system 504, memory 502, a network interface 506, a secondary storage device 508, an input device 510, a video interface 512, and a display unit 514. In other embodiments, the computing device 500 may be implemented using more or fewer hardware components (e.g., a video interface, a display unit, or an input device) or in combination with other types of computer systems and program modules. The memory 502 includes one or more computer-readable storage media capable of storing data and/or computer-executable instructions. According to one embodiment, the synchronized annotation system controller 122A,B may be stored locally on computing device 500. Memory 502 thus may store the computer-executable instructions that, when executed by processor 504, provide shared multimedia annotations for group-distributed video content as described above with reference to FIGS. 1-4.

In various embodiments, the memory 502 is implemented in various ways. For example, the memory 502 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media includes information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium refers only to devices and articles of manufacture that store data and/or computer-executable instructions readable by a computing device. Computer-readable storage medium do not include communications media. The term computer-readable storage media encompasses volatile and nonvolatile and removable and non-removable media implemented in various methods or technologies for storage and retrieval of information. Such information can include data structures, program modules, computer-executable instructions, or other data.

The processing system 504 includes one or more processing units, which may include tangible integrated circuits that selectively execute computer-executable instructions. In various embodiments, the processing units in the processing system 504 are implemented in various ways. For example, the processing units in the processing system 504 can be implemented as one or more processing cores. In this example, the processing system 504 can comprise one or more INTEL Core microprocessors. In another example, the processing system 504 can comprise one or more separate microprocessors. In yet another example embodiment, the processing system 504 can comprise Application-Specific Integrated Circuits (ASICs) that provide specific functionality. In yet another example, the processing system 504 provides specific functionality by using an ASIC and by executing computer-executable instructions.

The computing device 500 may be enabled to send data to and receive data from a communication network via a network interface card 506. In different embodiments, the network interface card 506 is implemented in different ways, such as an Ethernet interface, a token-ring network interface, a fiber optic network interface, a wireless network interface (e.g., WI-FI, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 508 includes one or more computer-readable storage media, and may store data and computer-executable instructions not directly accessible by the processing system 504. That is, the processing system 504 performs an I/O operation to retrieve data and/or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 510 enables the computing device 500 to receive input from a user. Example types of input devices include, but are not limited to, keyboards, mice, trackballs, stylus input devices, key pads, microphones, joysticks, touch-sensitive display screens, and other types of devices that provide user input to the computing device 500.

The video interface 512 outputs video information to the display unit 514. In different embodiments, the video interface 512 is implemented in different ways. For example, the video interface 512 is a video expansion card. In another example, the video interface 512 is integrated into a motherboard of the computing device 500. In various embodiments, the display unit 514 can be a an LCD display panel, a touch-sensitive display panel, an LED screen, a projector, a cathode-ray tube display, or another type of display unit. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processing system 504, the network interface card 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 502 stores various types of data and/or software instructions. For instance, in the example of FIG. 5, the memory 502 stores a Basic Input/Output System (BIOS) 518, and an operating system 520. The BIOS 518 includes a set of software instructions that, when executed by the processing system 504, cause the computing device 500 to boot up. The operating system 520 includes a set of software instructions that, when executed by the processing system 504, cause the computing device 500 to provide an operating system that coordinates the activities and sharing of resources of the computing device 500. The memory 502 also stores one or more application programs 522 that, when executed by the processing system 504, cause the computing device 500 to provide applications to users, for example, application software to create and/or display annotations. The memory 502 also stores one or more utility programs 524 that, when executed by the processing system 504, cause the computing device 500 to provide utilities to other software programs. Embodiments of the present invention may be utilized in various distributed computing environments where tasks are performed by remote processing devices that are linked through a communications network in a distributed computing environment.

Figure 6:
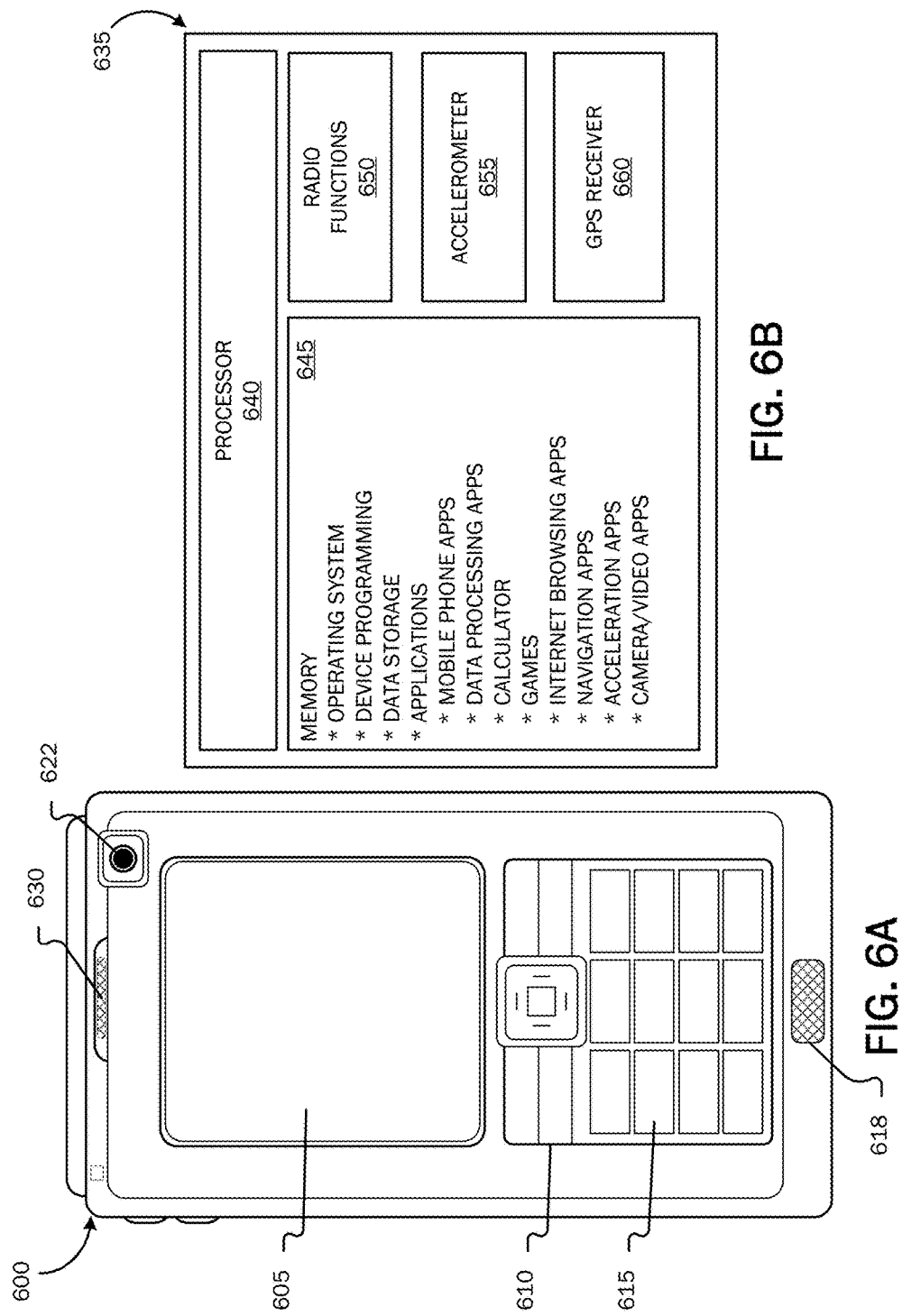
FIGS. 6A-6B illustrate a suitable mobile computing environment with which embodiments may be practiced.

FIGS. 6A-6B illustrate a suitable mobile computing environment, for example, a mobile computing device 600, a mobile phone/smartphone, a tablet device 306, a laptop computer, and the like, with which embodiments may be practiced. The mobile computing device 600 is illustrative of any suitable device operative to send, receive and process wireless communications according to embodiments of the present invention. A display screen 605 is operative for displaying a variety of information such as information about incoming and outgoing communications, as well as, a variety of data and displayable objects, for example, text, alphanumeric data, photographs, and the like.

Data input to the device 600 may be performed via a variety of suitable means, such as, touch screen input via the display screen 605, keyboard or keypad input via a data entry area 610, key input via one or more selectable buttons or controls 615, voice input via a microphone 618 disposed on the device 600, photographic input via a camera 622 functionality associated with the mobile computing device, or any other suitable input means. Data may be output via the device 600 via any suitable output means, including but not limited to, display on the display screen 605, audible output via an associated speaker 630 or connected earphone system, vibration module for providing tactile output, and the like.

Referring now to FIG. 6B, operational unit 635 is illustrative of internal operating functionality of the mobile computing device 600. A processor 640 is illustrative of a general purpose computer processor for processing incoming and outgoing data and communications and controlling operation of the device and associated software applications via a mobile computing device operating system. Memory 645 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, application software to create and/or display annotations may be stored locally on mobile computing device 600.

Mobile computing device 600 may contain an accelerometer 655 for detecting acceleration, and can be used to sense orientation, vibration, and/or shock. Mobile computing device 600 may contain a global positioning system (GPS) system (e.g., GPS send/receive functionality) 660. A GPS system 660 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 650 include all required functionality, including onboard antennae, for allowing the device 600 to communicate with other communication devices and systems via a wireless network.

Radio functions 650 may be utilized to communicate with a wireless or WI-FI based positioning system to determine a device's 600 location.

Figure 7:
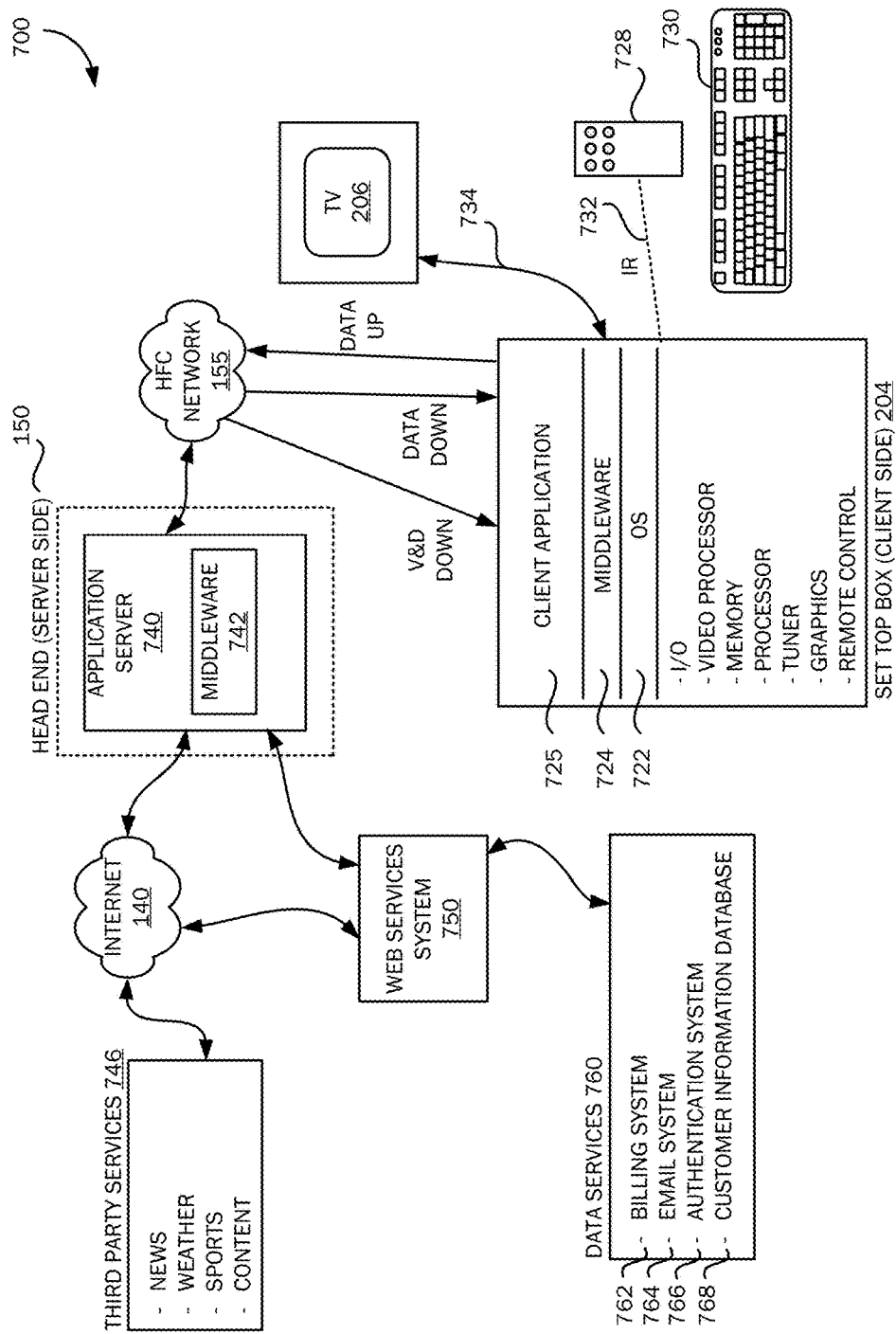
FIG. 7 is a simplified block diagram illustrating a cable television services system architecture providing an operating environment according to an embodiment.

FIG. 7 is a simplified block diagram illustrating a cable television services system 700 (hereafter referred to as "CATV") architecture providing an operating environment according to an embodiment. As can be appreciated, a CATV architecture is but one of various types of systems that may be utilized to provide substituted VOD content. Referring now to FIG. 7, digital and analog video programming, information content and interactive television services are provided via a hybrid fiber coax (HFC) network 155 to a television set 206 for consumption by a cable television/services system customer. As is known to those skilled in the art, HFC networks 155 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 155 allows for efficient bidirectional data flow between the client-side set-top box 204 and a server-side application server 740.

The CATV system 700 is in the form of a distributed client-server computing system for providing video and data flow across the HFC network 155 between server-side services providers (e.g., cable television/services providers) via a server-side head end 150 and a client-side customer via a client-side set-top box (STB) 204 in communication with a customer receiving device, such as the television set 206. As is understood by those skilled in the art, modern CATV systems 700 may provide a variety of services across the HFC network 155 including traditional digital and analog video programming, telephone services, high speed Internet access, video-on-demand, and information services.

On the client side of the CATV system 700, digital and analog video programming and digital and analog data are provided to the customer television set 206 via the set-top box (STB) 204. Interactive television services that allow a customer to input data to the CATV system 700 likewise are provided by the STB 204. As illustrated in FIG. 7, the STB 204 is a multipurpose computing device having a computer processor, memory, and an input/output mechanism. The input/output mechanism receives input from server-side processes via the HFC network 155 and from customers via input devices such as the remote control device 728, keyboard 730, or other computing device, such as a tablet/slate computer 306, smart phone 600, etc. The remote control device 728 and the keyboard 730 may communicate with the STB 204 via a suitable communication transport such as the infrared connection 732. The STB 204 also includes a video processor for processing and providing digital and analog video signaling to the television set 206 via a cable communication transport 734. A multi-channel tuner is provided for processing video and data to and from the STB 204 and the server-side head end system 150, described below.

The STB 204 also includes an operating system 722 for directing the functions of the STB 204 in conjunction with a variety of client applications 725. For example, if a client application 725 requires a news flash from a third-party news source to be displayed on the television 206, the operating system 722 may cause the graphics functionality and video processor of the STB 204, for example, to output the news flash to the television 206 at the direction of the client application 725 responsible for displaying news items.

Because a variety of different operating systems 722 may be utilized by a variety of different brands and types of set-top boxes, a middleware layer 724 may be provided to allow a given software application to be executed by a variety of different operating systems. According to an embodiment, the middleware layer 724 may include a set of application programming interfaces (APIs) that are exposed to client applications 725 and operating systems 722 that allow the client applications to communicate with the operating systems through common data calls understood via the API set. As described below, a corresponding middleware layer is included on the server side of the CATV system 700 for facilitating communication between the server-side application server and the client-side STB 204. The middleware layer 742 of the server-side application server and the middleware layer 724 of the client-side STB 204 may format data passed between the client side and server side according to the Extensible Markup Language (XML).

According to one embodiment, the set-top box 204 passes digital and analog video and data signaling to the television 206 via a one-way communication transport 734. According to other embodiments, two-way communication transports may be utilized, for example, via high definition multimedia (HDMI) ports. The STB 204 may receive video and data from the server side of the CATV system 700 via the HFC network 155 through a video/data downlink and data via a data downlink. The STB 204 may transmit data from the client side of the CATV system 700 to the server side of the CATV system 700 via the HFC network 155 via one data uplink. The video/data downlink is an "in band" downlink that allows for digital and analog video and data signaling from the server side of the CATV system 700 through the HFC network 155 to the set-top box 204 for use by the STB 204 and for distribution to the television set 206. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 7, between the HFC network 155 and the set-top box 204 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 204 and the server-side application server 740 is typically passed through the "out of band" data links. Alternatively, an "in band" data carousel may be positioned in an "in band" channel into which a data feed may be processed from the server-side application server 740 through the HFC network 155 to the client-side STB 204. Operation of data transport between components of the CATV system 700, described with reference to FIG. 7, is well known to those skilled in the art.

Referring still to FIG. 7, the head end 150 of the CATV system 700 is positioned on the server side of the CATV system and includes hardware and software systems responsible for originating and managing content for distributing through the HFC network 155 to client-side STBs 204 for presentation to customers via television sets 206. As described above, a number of services may be provided by the CATV system 700, including digital and analog video programming, interactive television services, telephone services, video-on-demand services, targeted advertising, and provision of information content.

The application server 740 is a general-purpose computing system operative to assemble and manage data sent to and received from the client-side set-top box 204 via the HFC network 155. As described above with reference to the set-top box 204, the application server 740 includes a middleware layer 742 for processing and preparing data from the head end of the CATV system 700 for receipt and use by the client-side set-top box 204. For example, the application server 740 via the middleware layer 742 may obtain data from third-party services 746 via the Internet 140 for transmitting to a customer through the HFC network 155 and the set-top-box 204. For example, content metadata of a third-party content provider service may be downloaded by the application server 740 via the Internet 140. When the application server 740 receives the downloaded content metadata, the middleware layer 742 may be utilized to format the content metadata for receipt and use by the set-top box 204. Therefore, content metadata may be sent and categorized based on the availability to the customer's program guide data.

According to one embodiment, data obtained and managed by the middleware layer 742 of the application server 740 is formatted according to the Extensible Markup Language and is passed to the set-top box 204 through the HFC network 155 where the XML-formatted data may be utilized by a client application 725 in concert with the middleware layer 724, as described above. As should be appreciated by those skilled in the art, a variety of third-party services data, including news data, weather data, sports data and other information content may be obtained by the application server 740 via distributed computing environments such as the Internet 140 for provision to customers via the HFC network 155 and the set-top box 204.

According to embodiments, the application server 740 obtains customer support services data, including billing data, information on customer work order status, answers to frequently asked questions, services provider contact information, and the like from data services 760 for provision to the customer via an interactive television session. As illustrated in FIG. 7, the services provider data services 760 include a number of services operated by the services provider of the CATV system 700 which may include data on a given customer.

A billing system 762 may include information such as a customer's name, street address, business identification number, Social Security number, credit history, and information regarding services and products subscribed to by the customer. According to embodiments, the billing system 762 may also include billing data for services and products subscribed to by the customer for bill processing, billing presentment and payment receipt.

A customer information database 768 may include general information about customers such as place of employment, business address, business telephone number, and demographic information such as age, gender, educational level, and the like. The customer information database 768 may also include information on pending work orders for services or products ordered by the customer. The customer information database 768 may also include general customer information such as answers to frequently asked customer questions and contact information for various service provider offices/departments. As should be understood, this information may be stored in a variety of disparate databases operated by the cable services provider.

Referring still to FIG. 7, web services system 750 is illustrated between the application server 740 and the data services 760. According to embodiments, web services system 750 serves as a collection point for data requested from each of the disparate data services systems comprising the data services 760. According to embodiments, when the application server 740 requires customer services data from one or more of the data services 760, the application server 740 passes a data query to the web services system 750. The web services system formulates a data query to each of the available data services systems for obtaining any required data for a requesting customer as identified by a set-top box identification associated with the customer. The web services system 750 serves as an abstraction layer between the various data services systems and the application server 740. That is, the application server 740 is not required to communicate with the disparate data services systems, nor is the application server 740 required to understand the data structures or data types utilized by the disparate data services systems. The web services system 750 is operative to communicate with each of the disparate data services systems for obtaining necessary customer data. The customer data obtained by the web services system is assembled and is returned to the application server 740 for ultimate processing via the middleware layer 742, as described above.

An authentication system 766 may include information such as secure user names, subscriber profiles, subscriber IDs, and passwords utilized by customers for access to network services. As should be understood by those skilled in the art, the disparate systems 762, 764, 766, 768 may be integrated or provided in any combination of separate systems, wherein FIG. 7 shows only one example.

Embodiments of the invention may be used in combination with any number of computer systems, such as in desktop environments, laptop or notebook computer systems, multiprocessor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-7. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

We claim:

1. A method comprising:
   receiving a piece of source video content;
   receiving a selection to share annotations with a group of users who have access to the source video content;
   receiving an indication to record a first annotation comprising a video annotation having an audio track associated with a location in the source video content, wherein the location comprises an annotation linkage location;
   creating metadata associating the first annotation to the location in the source video content;
   receiving a new annotation associated with the first annotation and the location in the source video content;
   creating metadata associating the new annotation with the first annotation and the location in the source video content;
   converting the audio track of the video annotation to text to enable display of the text of the converted audio track and preclude simultaneous audio track playback;
   notifying one or more users of the group of users that the annotations are shared and that the first annotation and the new annotation are associated with the source video content;
   controlling interaction with the annotations according to varying levels of control including controlling which of the one or more users can access the annotations and which of the one or more users can create associated annotations;
   requesting a list of annotation linkage locations for annotations associated with the source video content prior to playback of the source video content including annotation linkage locations associated with the new annotation and the first annotation;
   enabling a display of the first annotation and the new annotation synchronously with playback of the source video content with the simultaneous audio track playback according to an optimal viewing format;
   enabling a display of the first annotation and the new annotation synchronously with playback of the source video content absent the simultaneous audio track playback according to a different optimal viewing format; and
   storing the first annotation, the new annotation, and the associated metadata, wherein the associated metadata includes annotation metadata comprising a list of points in the source video content and a link to one or more annotations associated with each point including a timestamp, a frame marker, a chapter marker, or another annotation.

2. The method of claim 1, further comprising receiving the video annotation recorded by a camera of a smartphone.

3. The method of claim 1, further comprising:
   receiving an indication of a selection to share the first annotation with the one or more users; and
   providing a notification by sending an electronic message to the one or more users indicating that the first annotation associated with the source video content is being shared.

4. The method of claim 1, further comprising:
   receiving an indication of a selection to view the source video content and the associated first annotation; and
   providing the first annotation and associated metadata for display or play of the first annotation, wherein the first annotation is synchronized with the source video content.

5. The method of claim 4, wherein receiving an indication of a selection to view the source video content and the associated first annotation comprises:
   receiving an indication to view new or changed annotations;
   determining if the first annotation is new or changed since a previous display or play by a specified user; and
      if the first annotation is new or has been changed since the first annotation has been displayed or played by the specified user, providing the first annotation and associated metadata for display or play of the first annotation, wherein the first annotation is synchronized with the source video content; and
      skipping ahead in the source video content to the location in the source video content to which the first annotation is associated.

6. The method of claim 4, wherein receiving an indication of a selection to view the source video content and the first annotation comprises receiving an indication of a selection to view the source video content and the first annotation on a same device or on separate devices.

7. The method of claim 4, further comprising:
   prior to providing the first annotation and associated metadata for display or play, determining the optimal viewing format; and
   if the determined optimal viewing format is different than a current format of the first annotation, converting the first annotation to the determined format for optimal viewing.

8. The method of claim 7, wherein converting the first annotation to the determined format for optimal viewing comprises one or more of:
   converting an audio annotation into an overlay text; or
   translating a text annotation into a preferred language.

9. The method of claim 4, further comprising:
   receiving an indication of a selection to record a second annotation at a new location in the source video content or associated with the first annotation;
   creating metadata associating the second annotation to the new location in the source video content;
   storing the second annotation and the associated metadata;
   receiving an indication of a selection to share the second annotation with the one or more users; and
   providing a notification by sending an electronic message to the one or more users indicating that the second annotation associated with the source video content is being shared.

10. The method of claim 1, wherein the first annotation is a sponsored annotation.

11. The method of claim 10, further comprising:
    receiving an indication of a selection from a first user to view the source video content;
    determining if the first user has opted out of receiving sponsored annotations; and
       if the first user has not opted out of receiving sponsored annotations, providing the first annotation and associated metadata for display or play of the first annotation, wherein the first annotation is synchronized with the source video content.

12. The method of claim 11, further comprising tracking a number of viewings of the sponsored annotation.

13. A system comprising:
    a memory storage; and
    one or more processing units coupled to the memory storage, wherein the one or more processing units are operable to:

receive a piece of source video content;
receive a selection to share annotations with a group of users who have access to the source video content;
receive an indication to record a first annotation comprising a video annotation having an audio track at a location in the source video content, wherein the location comprises an annotation linkage location;
create metadata associating the first annotation to the location in the source video content;
receive a new annotation associated with the first annotation and the location in the source video content;
create metadata associating the new annotation with the first annotation and the location in the source video content;
convert the audio track of the video annotation to text to enable display of the text of the converted audio track and preclude simultaneous audio track playback;
notify one or more users of the group of users that the annotations are shared and that the first annotation and the new annotation are associated with the source video content;
control interaction with the annotations according to varying levels of control that include controlling which of the one or more users can access the annotations and which of the one or more users can create associated annotations;
request a list of annotation linkage locations for annotations associated with the source video content prior to playback of the source video content including annotation linkage locations associated with the new annotation and the first annotation;
enable a display of the first annotation and the new annotation synchronously with playback of the source video content with the simultaneous audio track playback according to an optimal viewing format;
enable a display the first annotation and the new annotation synchronously with playback of the source video content absent the simultaneous audio track playback according to a different optimal viewing format; and
store the first annotation, the new annotation, and the associated metadata, wherein the associated metadata includes annotation metadata comprising a list of points in the source video content and a link to one or more annotations associated with each point including a timestamp, a frame marker, a chapter marker, or another annotation.

14. The system of claim 13, wherein the one or more processing units are further operable to:
receive an indication of a selection to share the first annotation with the one or more users; and
provide a notification by sending an electronic message to the one or more users indicating that the first annotation associated with the source video content is being shared.

15. The system of claim 13, wherein the one or more processing units are further operable to:
receive an indication of a selection to view the source video content and the associated first annotation; and
provide the first annotation and associated metadata for display or play of the first annotation, wherein the first annotation is synchronized with the source video content.

16. The system of claim 15, wherein the one or more processing units are further operable to:
receive an indication to view new or changed annotations;
determine if the first annotation is new or changed since a previous display or play by a specified user; and
if the first annotation is new or has been changed since the first annotation has been displayed or played by the specified user, provide the first annotation and associated metadata for display or play of the first annotation, wherein the first annotation is synchronized with the source video content; and
skip ahead in the source video content to the location in the source video content to which the first annotation is associated.

17. The system of claim 15, wherein the one or more processing units are operable to receive an indication of a selection to view the source video content and the associated annotations on a same device or on separate devices.

18. The system of claim 15, wherein the one or more processing units are further operable to:
prior to providing the first annotation and associated metadata for display or play, determine the optimal viewing format; and
if the determined optimal viewing format is different than a current format of the first annotation:
convert the first annotation to the determined format for optimal viewing, wherein the one or more processing units are operable to:
convert an audio annotation into an overlay text; or
translate a text annotation into a preferred language.

19. The system of claim 15, wherein the one or more processing units are further operable to:
receive an indication of a selection to record a second annotation at a new location in the source video content or associated with the first annotation;
create metadata associating the second annotation to the new location in the source video content;
store the second annotation and the associated metadata;
receive an indication of a selection to share the second annotation with the one or more users; and
provide a notification by sending an electronic message to the one or more users indicating that the second annotation associated with the source video content is being shared.

20. The system of claim 13, wherein the first annotation is a sponsored annotation and the one or more processing units are further operable to:
receive an indication of a selection from a first user to view the source video content;
determine if the first user has opted out of receiving sponsored annotations; and
if the first user has not opted out of receiving sponsored annotations, provide the first annotation and associated metadata for display or play of the first annotation, wherein the first annotation is synchronized with the source video content.

21. A non-transitory computer readable medium containing computer executable instructions which when executed by a computer perform a method comprising:
receiving a piece of source video content;
receiving a selection to share annotations with a group of users who have access to the source video content;
receiving an indication to record a first annotation comprising a video annotation having an audio track associated with a location in the source video content, wherein the location comprises an annotation linkage location;

creating metadata associating the first annotation to the location in the source video content;
receiving a new annotation associated with the first annotation and the location in the source video content;
creating metadata associating the new annotation with the first annotation and the location in the source video content;
converting the audio track of the video annotation to text to enable display of the text of the converted audio track and preclude simultaneous audio track playback;
notifying one or more users of the group of users that the annotations are shared and that the first annotation and the new annotation are associated with the source video content;
controlling interaction with the annotations according to varying levels of control including controlling which of the one or more users can access the annotations and which of the one or more users can create associated annotations;
requesting a list of annotation linkage locations for annotations associated with the source video content prior to playback of the source video content including annotation linkage locations associated with the new annotation and the first annotation;
enabling a display of the first annotation and the new annotation synchronously with playback of the source video content with the simultaneous audio track playback according to an optimal viewing format;
enabling a display of the first annotation and the new annotation synchronously with playback of the source video content absent the simultaneous audio track playback according to a different optimal viewing format;
storing the first annotation, the new annotation, and the associated metadata, wherein the associated metadata includes annotation metadata comprising a list of points in the source video content and a link to one or more annotations associated with each point including a timestamp, a frame marker, a chapter marker, or another annotation; and
receiving an indication of a selection to view the source video content and the associated annotations.

22. The computer readable medium of claim 21, further comprising:
receiving an indication to view new or changed annotations;
determining if the first annotation is new or changed since a previous display or play by a specified user; and
if the first annotation is new or has been changed since the first annotation has been displayed or played by the specified user, providing the first annotation and associated metadata for display or play of the first annotation, wherein the first annotation is synchronized with the source video content; and
skipping ahead in the source video content to the location in the source video content to which the first annotation is associated.

23. The computer readable medium of claim 21, further comprising receiving an indication of a selection to view the source video content and the associated annotations on a same device or on separate devices.

24. The computer readable medium of claim 21, further comprising:
prior to providing the first annotation and associated metadata for display or play, determining the optimal viewing format; and
if the determined optimal viewing format is different than a current format of the first annotation:
converting an audio annotation into an overlay text; or
translating a text annotation into a preferred language.

25. The computer readable medium of claim 24, further comprising:
receiving an indication of a selection to record a second annotation at a new location in the source video content or associated with the first annotation;
creating metadata associating the second annotation to the new location in the source video content or to the first annotation;
storing the second annotation and the associated metadata;
receiving an indication of a selection to share the second annotation with the one or more users; and
providing a notification by sending an electronic message to the one or more users indicating that the second annotation associated with the source video content is being shared.

26. The computer readable medium of claim 21, wherein the first annotation is a sponsored annotation and the method further comprises:
receiving an indication of a selection from a first user to view the source video content;
determining if the first user has opted out of receiving sponsored annotations; and
if the first user has not opted out of receiving sponsored annotations, providing the first annotation and associated metadata for display or play of the first annotation, wherein the first annotation is synchronized with the source video content.

27. The computer readable medium of claim 26, further comprising tracking a number of viewings of the sponsored annotation.

* * * * *